United States Patent
Kimura et al.

(10) Patent No.: US 6,833,523 B2
(45) Date of Patent: Dec. 21, 2004

(54) WIRE CUT ELECTRIC DISCHARGE MACHINE WITH FLUID COOLER AND METHOD OF MACHINING

(75) Inventors: Munenori Kimura, Tokyo (JP); Akihiro Goto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/415,373

(22) PCT Filed: Feb. 14, 2001

(86) PCT No.: PCT/JP01/01034

§ 371 (c)(1),
(2), (4) Date: Apr. 28, 2003

(87) PCT Pub. No.: WO02/064299

PCT Pub. Date: Aug. 22, 2002

(65) Prior Publication Data

US 2004/0026379 A1 Feb. 12, 2004

(51) Int. Cl.[7] .................................. B23H 7/02
(52) U.S. Cl. ................................... 219/69.12
(58) Field of Search .................... 219/69.12, 69.14, 219/69.17

(56) References Cited

U.S. PATENT DOCUMENTS

| | | | | |
|---|---|---|---|---|
| 4,857,688 A | * | 8/1989 | Aso et al. ................ | 219/69.14 |
| 6,686,554 B1 | * | 2/2004 | Goto et al. ............... | 219/69.12 |
| 6,713,705 B1 | * | 3/2004 | Satou et al. .............. | 219/69.12 |
| 6,744,002 B1 | * | 6/2004 | Goto ........................ | 219/69.12 |

FOREIGN PATENT DOCUMENTS

| | | | |
|---|---|---|---|
| JP | 57-194831 A | | 11/1982 |
| JP | 61-293723 A | * | 12/1986 |
| JP | 62-193724 A | * | 8/1987 |
| JP | 01-11334 Y2 | | 4/1989 |
| JP | 2-65920 A | * | 3/1990 |

OTHER PUBLICATIONS

U.S. patent application Ser. No. 10/069,504, Goto et al., filed Feb. 27, 2002.
U.S. patent applicaiton Ser. No. 10/048,571, Goto et al., filed Feb. 4, 2002.
U.S. patent application Ser. No. 10/148,545, Satou et al., filed Jun. 4, 2002.
"Dry Electrical Discharge Machining" Masanori Kunieda et al., Journal of Japan Society for Precision Engineering, vol. 64 No. 12, pp1735–1738 (1998).
"Improving of Accuracy of Second–Cut using Dry WEDM" Adachi et al., vol. 147 pp. 154–155, Japan Society of Die and Mould Technology, published Jul., 1999.

* cited by examiner

*Primary Examiner*—Geoffrey S. Evans
(74) *Attorney, Agent, or Firm*—Sughrue Mion, PLLC

(57) ABSTRACT

A wire electrical discharge machining apparatus for machining a workpiece by supplying electric discharge energy to a gap between a wire electrode and the workpiece by machining-electric-power supplying section and by relatively moving the wire electrode and the workpiece by a positioning section has a fluid supplying section in which a working-fluid supplying section for supplying a working liquid to the gap, a mist supplying section for supplying a mist to the gap, a gas supplying section for supplying a gas to the gap, and a cooling-fluid supplying section for supplying the working liquid which is a cooling fluid for cooling the workpiece are combined and are formed integrally. It is possible to effect wire electrical discharge machining which is suitable for attainment of higher accuracy and higher quality.

11 Claims, 8 Drawing Sheets

A-A

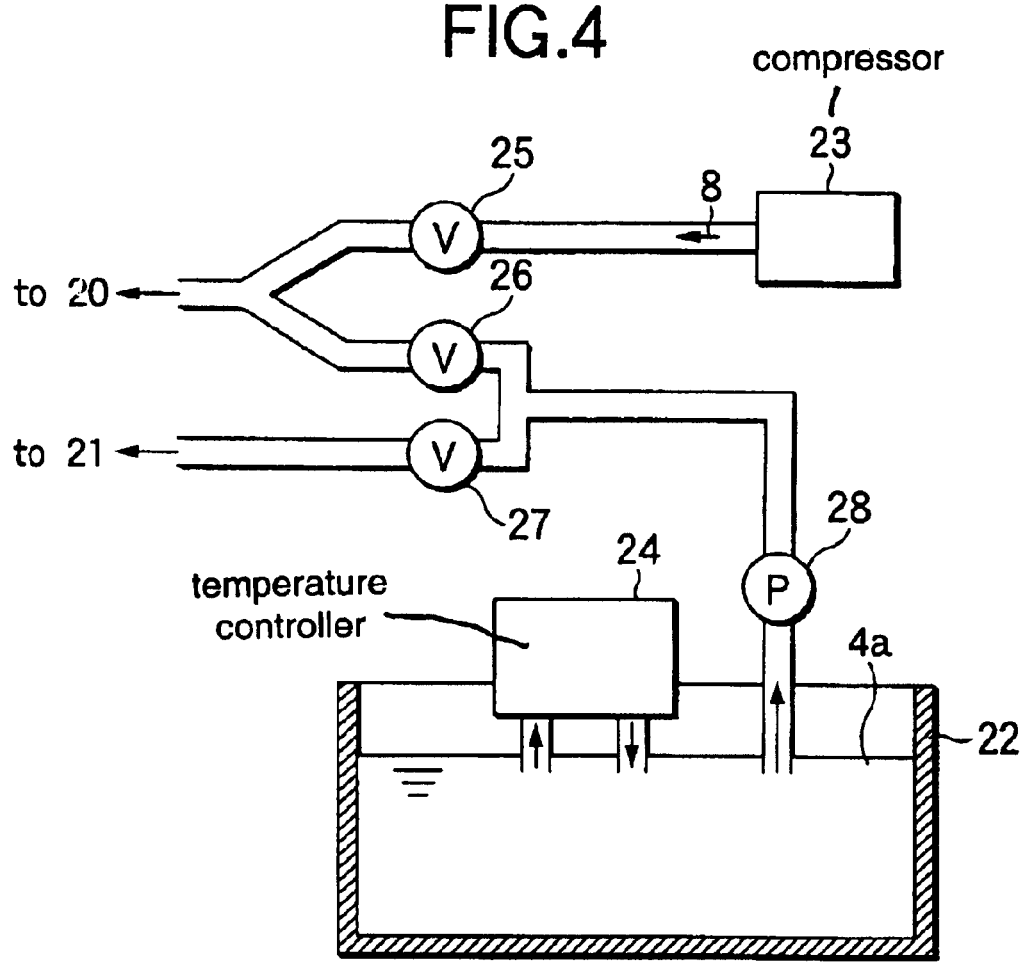

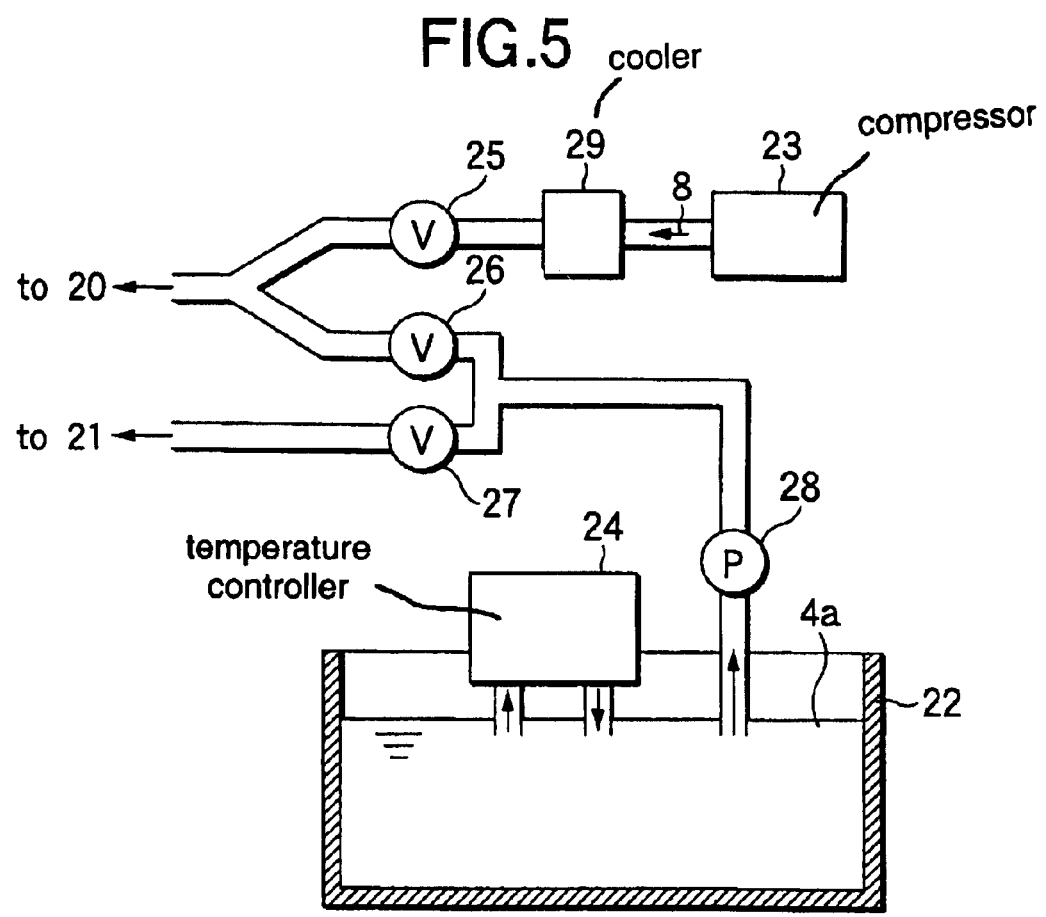

RAPORIZATION OF WORKING LIQUID
FUSION

GENERATION OF EXPLOSIVE FORCE OF RAPORIZATION

WIRE CUT ELECTRIC DISCHARGE MACHINE WITH FLUID COOLER AND METHOD OF MACHINING

TECHNICAL FIELD

The present invention relates to improvements of a method of and an apparatus for wire electrical discharge machining for machining a workpiece on the basis of electric discharge energy by supplying working electric power across a gap between a wire electrode and the workpiece.

BACKGROUND ART

Electrical discharge machining has established a solid position as a machining technology for such as dies and molds, and has been extensively used in the fields of the automobile industry, the household electrical appliance industry, the semiconductor industry, and the like.

FIG. 7 is an explanatory diagram of the mechanism of electrical discharge machining. In the drawing, reference numeral 1 denotes an electrode; 2, a workpiece; 3, an arc column; 4, a working liquid; and 5, machining debris produced in electrical discharge machining. Removal machining based on the electric discharge in the workpiece 2 progresses while repeating the cycle (corresponding to steps (a) to (e) in FIG. 7) of the following steps (a) to (e): Namely, these steps are (a) the formation of the arc column 3 due to the generation of electrical discharge, (b) the local fusion and the vaporization of the working liquid 4 due to the thermal energy of electric discharge, (c) the generation of an explosive force of vaporization of the working liquid 4, (d) the scattering of a fused portion (machining debris 5), and (e) cooling, solidification, and recovery of insulation between the electrodes due to the working liquid.

This invention concerns wire electrical discharge machining which is used in boring, cutting, and the like in electrical discharge machining. In particular, there has been a growing demand for higher precision in the wire electrical discharge machining, and high machining accuracy on the order of 1 to 2 μm or thereabouts has come to be required in the machining of high-precision dies and molds used in the semiconductor industry and the like.

FIG. 8 is an explanatory diagram illustrating an example of the machining process of wire electrical discharge machining. In the drawing, reference numeral 1a denotes a wire electrode; 2, the workpiece; 4a, a working liquid which is, for example, water; and 6, an initial hole. The part (a) of FIG. 8 shows the state of a first cut which is rough machining, the part (b) of FIG. 8 shows the state of a second cut which is semi-finish machining after rough finishing, and the part (c) of FIG. 8 shows the state of a third cut which is final finish machining.

The example of the machining of the first cut in the part (a) of FIG. 8 shows machining in which the wire electrode 1a is passed through the initial hole 6, and the workpiece 2 is bored. In the case of such a first cut, since the surface roughness and accuracy are finished in subsequent machining, very strict surface roughness and accuracy are not required so much, and it is important to increase the machining speed, in particular, so as to improve productivity. In wire electrical discharge machining, in order to increase the machining speed, the injection of the working liquid 4a to the gap between the wire electrode 1a and the workpiece 2 is practiced to efficiently discharge the machining debris from the gap. In addition, in order to eliminate the unevenness of the application of the working liquid 4a to the gap and prevent the disconnection of the wire electrode 1a, a method is adopted in which the working liquid 4a stored in an unillusirated working tank and the workpiece 2 is immersed in it. Thus a working-liquid supplying section is used for supplying the working liquid to the gap between the wire electrode 1a and the workpiece 2.

In the above-described conventional wire electrical discharge machining, the machining after the first cut (the part (a) in FIG. 8), such as the second cut (the part (b) in FIG. 8) and the third cut (the part (c) in FIG. 8), is also performed in the working liquid 4a.

When a voltage is applied across the gap between the wire electrode 1a and the workpiece 2, a force acts in which the positive polarity and the negative polarity are attracted toward each other, so that the wire electrode 1a having small rigidity is pulled toward the workpiece 2 side by this electrostatic force. This causes the vibration of the wire electrode 1a, so that there has been a problem in that high-accuracy machining is made difficult due to such vibration.

In addition, in a state in which the explosive force of vaporization of the working liquid has been generated due to the discharge energy (e.g., the part (c) in FIG. 7), a large force acts on the wire electrode 1a in a direction opposite to that of the workpiece 2 due to the explosive force of vaporization of the working liquid, so that vibrations occur. There has been a problem in that irregularities occur in the shape of the workpiece 2 due to such vibrations, which leads to the deterioration of the accuracy.

Further, in the semiconductor industry and the like, which are the fields of application of wire electrical discharge machining, in the machining of such as a die for IC leadframes, applications are increasing in which extremely high accuracy and very smooth surface roughness are required for a workpiece whose form accuracy is 1 μm and whose surface roughness is 1 μm Rmax or less. In such uses, in particular, the above-described problem ascribable to the vibration and the like of the wire electrode has been noticeable.

As a measure for overcoming such problems of wire electrical discharge machining in a liquid, a technique concerning aerial wire electrical discharge machining has been disclosed in which wire electrical discharge machining is performed in the atmosphere without a working liquid interposed in the gap between the wire electrode and the workpiece (Adachi, Tokyo University of Agriculture and Technology, et al.: "Attaining High Precision in Second Cuts by Aerial EDM," *Die & Mold Technology*, Vol. 14, No. 7, 1999, p. 154, The Nikkan Kogyo Shimbun, Ltd.). In this technique, it is disclosed that accuracy in the straightness of cut surfaces of workpieces can be improved by wire electrical discharge machining in the atmosphere. However, although its significance from the perspective of the attainment of high precision is large as compared with the ordinary wire electrical discharge machining in a working liquid, it is impossible to make use of the cooling effect by means of the working liquid (e.g., the part (e) of FIG. 7) in a case where wire electrical discharge machining is performed in such an atmosphere or wire electrical discharge machining is performed in a mist. Therefore, it is impossible to sufficiently cool the gap between the wire electrode and the workpiece, and machining progresses in the state in which thermal strains have occurred in the workpiece due to the heat generated by electric discharge. Hence there has been a problem in that this technique cannot cope with applications in which extremely high accuracy and very smooth surface roughness are required for workpieces such as those mentioned above.

DISCLOSURE OF THE INVENTION

This invention has been devised to overcome the above-described problems, and its object is to provide a method of and an apparatus for wire electrical discharge machining which are suitable for attainment of high accuracy and high quality in wire electrical discharge machining.

The method of wire electrical discharge machining in accordance with this invention is a method of wire electrical discharge machining for machining a workpiece by generating electric discharge in a gap between a wire electrode and the workpiece, wherein machining is performed by combining at least two kinds of machining among three kinds of machining including machining in a working liquid, machining in a mist, and machining in a gas, and in a process of machining in the mist or the gas, machining is performed while cooling the workpiece.

The wire electrical discharge machining apparatus in accordance with this invention is a wire electrical discharge machining apparatus for machining a workpiece by supplying electric discharge to a gap between a wire electrode and the workpiece by machining-electric-power supplying section and by relatively moving the wire electrode and the workpiece by positioning sections, the wire electrical discharge machining apparatus comprising: a working-fluid supplying section for supplying at least two working fluids of working-liquid supplying section for supplying a working liquid to the gap, a mist supplying section for supplying a mist to the gap, and a gas supplying section for supplying a gas to the gap; and cooling-fluid supplying section for supplying a cooling fluid for cooling the workpiece.

In addition, the wire electrical discharge machining apparatus in accordance with this invention is a wire electrical discharge machining apparatus for machining a workpiece by supplying electric discharge energy to a gap between a wire electrode and the workpiece by machining-electric-power supplying section and by relatively moving the wire electrode and the workpiece by positioning sections, the wire electrical discharge machining apparatus comprising: working-fluid supplying section for supplying at least two working fluids of working-liquid supplying section for supplying a working liquid to the gap, mist supplying section for supplying a mist to the gap, and gas supplying section for supplying a gas to the gap; cooling-fluid supplying section for supplying a cooling fluid for cooling the workpiece; and a controlling section for effecting a changeover among the supply of the working liquid to the gap by the working-liquid supplying section, the supply of the mist to the gap by the mist supplying section, and the supply of the gas to the gap by the gas supplying section, and for controlling the supply of the cooling fluid to the workpiece by the cooling-fluid supplying section during the supplying of the mist to the gap by the mist supplying section or during the supply of the gas to the gap by the gas supplying section, in accordance with productivity, the accuracy required for the workpiece, and the like.

In addition, in the wire electrical discharge machining apparatus in accordance with this invention, the working-fluid supplying section supplies the working fluid to the gap along the wire electrode, and the cooling-fluid supplying section injects the cooling fluid from outside the working fluid toward the workpiece.

In addition, the wire electrical discharge machining apparatus in accordance with this invention has a fluid supplying section in which the working-fluid supplying section and the cooling-fluid supplying section are combined and are formed integrally.

In addition, in the wire electrical discharge machining apparatus in accordance with this invention, the working-liquid supplying means supplies the working liquid in a working liquid tank to the gap by means of a pump, the gas supplying means supplies the gas such as air to the gap after pressurizing the gas by a compressor, and the mist supplying means produces a mist by mixing the working liquid supplied by the working-liquid supplying means and the gas supplied by the gas supplying means and supplies the mist to the gap.

In addition, in the wire electrical discharge machining apparatus in accordance with this invention, the working-liquid supplying section supplies the working liquid in a working liquid tank to the gap by means of a pump, the gas supplying section supplies the gas such as air to the gap after pressurizing the gas by a compressor, and the mist supplying section produces a mist by mixing the working liquid supplied by the working-liquid supplying section and the gas supplied by the gas supplying section and supplies the mist to the gap.

In addition, in the wire electrical discharge machining apparatus in accordance with this invention, the cooling-fluid supplying section pressurizes the working liquid in the working liquid tank by the pump and supplies it to the gap.

In addition, the wire electrical discharge machining apparatus in accordance with this invention further comprises: a cooling section for cooling the gas pressurized by the compressor.

In addition, in the wire electrical discharge machining apparatus in accordance with this invention, the cooling section is formed by using a heat exchanger disposed in the working liquid tank.

BRIEF DESCRIPTION OF THE DRAWINGS

FIG. 4 is an explanatory diagram of a method of supplying the fluid to the supplying section of the wire electrical discharge machining apparatus in accordance with the first embodiment of this invention;

FIG. 5 is an explanatory diagram of a method of supplying the fluid to the fluid supplying section of the wire electrical discharge machining apparatus in accordance with a second embodiment of this invention;

BEST MODE FOR CARRYING OUT THE INVENTION

First Embodiment

Figure 1A:
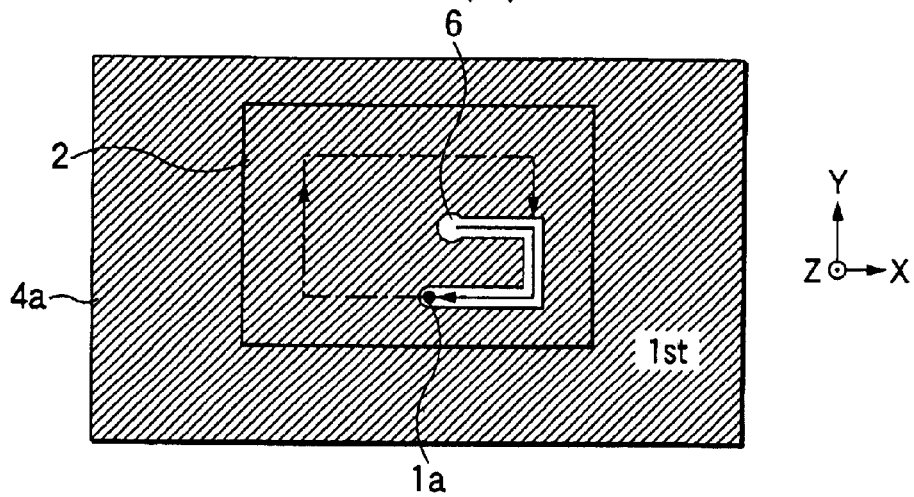
FIG. 1 is an explanatory diagram illustrating an example of a method of wire electrical discharge machining in accordance with a first embodiment of this invention.
Figure 1B:
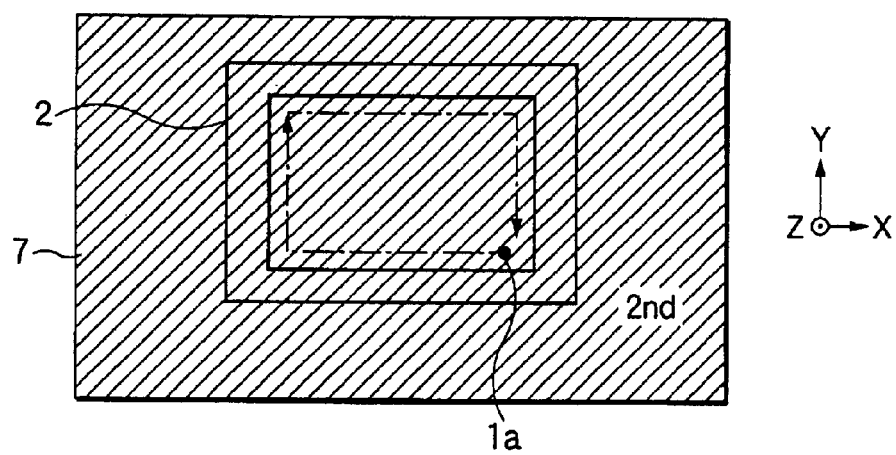
Figure 1C:
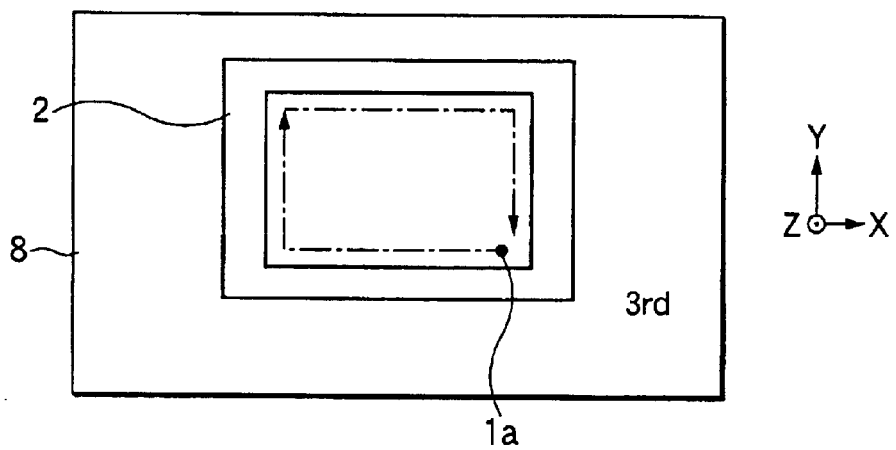

FIG. 1 is an explanatory diagram illustrating an example of a method of wire electrical discharge machining in accordance with a first embodiment of this invention. In the drawing, reference numeral $1a$ denotes a wire electrode, reference numeral 2 denotes a workpiece, reference numeral $4a$ denotes a working liquid which is, for example, water, reference numeral 6 denotes an initial hole. Reference numeral 7 denotes mist such as water and reference numeral 8 denotes gas such as air. FIG. $1(a)$ shows a first cut which is rough machining. FIG. $1(b)$ shows a second cut which is semi-finish machining after the rough finishing. FIG. $1(c)$ shows a third cut which is final finish machining. The appellations of the first cut, the second cut, and the third cut are for the sake of convenience, and it is not necessary that wire electrical discharge machining is completed in three steps of machining. In machining in which the accuracy required for the workpiece is low, there are cases where machining is completed by only the first cut or only the first cut and the second cut; in machining in which the accuracy required for the workpiece is high, there are cases where machining is performed in as many as seven or eight steps.

Figure 8A:
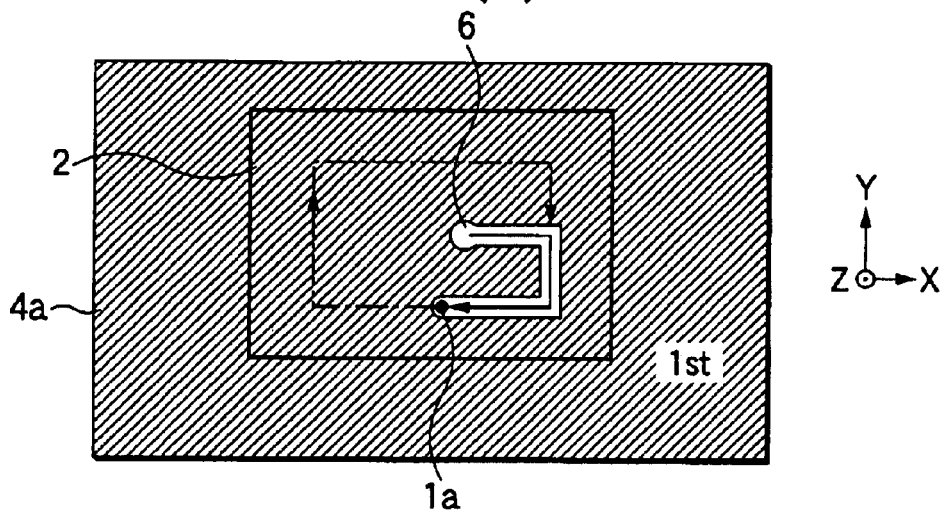
FIG. 8 is an explanatory diagram illustrating an example of the machining process of wire electrical discharge machining.
Figure 8B:
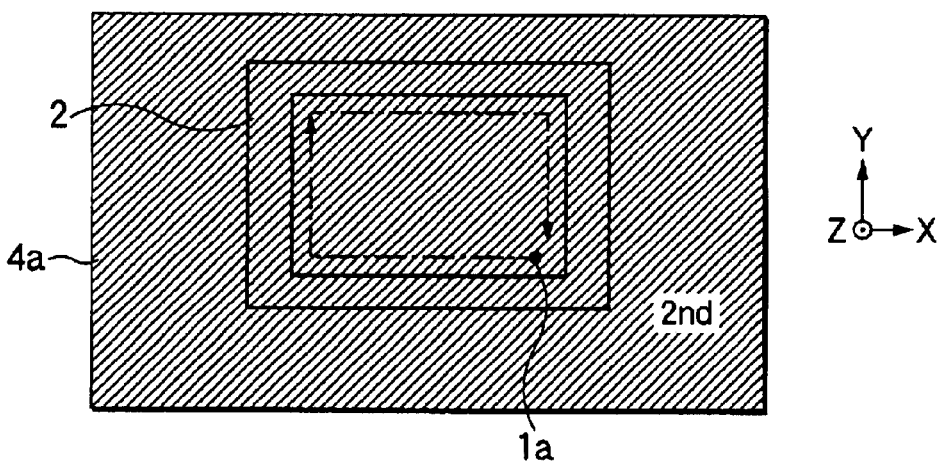
Figure 8C:
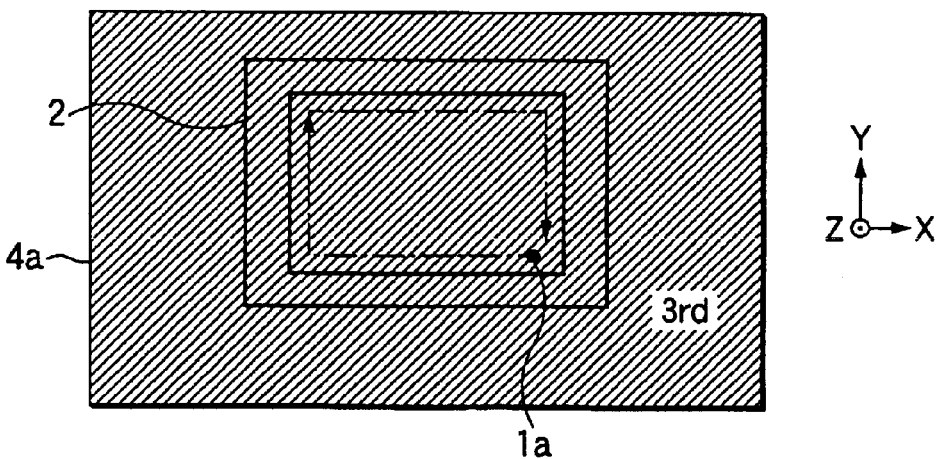

Next, a description will be given of an outline of the machining method. The first cut shown in FIG. $1(a)$ is machining in which the wire electrode $1a$ is passed through the initial hole 6 and the workpiece 2 is bored. In the first cut, since the surface roughness and accuracy are finished in subsequent machining, strict surface roughness and accuracy are not required so much, and it is important to increase particularly the machining speed to improve productivity. In the same way as in FIG. 8 concerning the background art, machining is performed with the working liquid $4a$ interposed in a gap between the wire electrode $1a$ and the workpiece 2 by means of a working-liquid supplying section for supplying the working liquid to the gap. As this working-liquid supplying section, at least either one of a section for storing the working liquid $4a$ in a working tank and for immersing the workpiece 2 in it and a section for jetting the working liquid $4a$ to the gap between the electrodes is used.

In ordinary wire electrical discharge machining, machining proceeds while the working liquid is being supplied to the gap by the working-liquid supplying section even after the first cut. However, since there are problems such as the vibration of the wire electrode as shown in the background art, the ordinary wire electrical discharge machining is not suitable for high-accuracy machining.

In this invention, machining is performed without the working liquid interposed in the gap in finish machining so as to improve the accuracy and surface roughness of the workpiece.

In the second cut in FIG. $1(b)$, which is semi-finish machining, machining is performed not in the working liquid $4a$ but in the mist 7 to suppress the vibration of the wire electrode $1a$ and to improve the machining form accuracy. The machining speed in the mist 7 is in no way inferior to machining in the working liquid $4a$, and machining accuracy improves since the vibration of the wire electrode $1a$ is suppressed due to the electrostatic force. Machining in the mist 7 can be performed by spraying a mist to the gap between the wire electrode $1a$ and the workpiece 2 by, for example, an unillustrated mist supplying section.

In addition, in the case of the third cut in FIG. $1(c)$, which is the final finish machining, the vibration of the wire electrode $1a$ can be further suppressed by using electric discharge in the gas 8. Machining in the gas 8 can be performed in the atmosphere or by jetting a gas having predetermined components to the gap between the wire electrode $1a$ and the workpiece 2 by an unillustrated gas supplying section.

The reason that high accuracy can be obtained by the above-described electrical discharge machining in the mist 7 and in the gas 8 is as follows: Since the electrostatic force acting in the gap between the wire electrode $1a$ and the workpiece 2 when a voltage is applied across the gap is proportional to the dielectric constant of the gap, if a calculation is made under the assumption that a length of the gap is the same, in the case where the interposed object in the gap is the mist 7 or the gas 8 the electrostatic force becomes one-tenths (for example, the dielectric constant is the smallest in a vacuum, and in water it is about 80-fold that in a vacuum) as compared with the case where the interposed object between the electrodes is the working liquid $4a$. In addition, since the explosive force of vaporization due to the electric discharge is generated by the liquid interposed between the electrodes, in the case where only the mist 7 or the gas 8 is present in the gap, the wire electrode $1a$ is practically not affected by the explosive force of vaporization.

Accordingly, high-precision wire electrical discharge machining can be performed by the electric discharge in the mist 7 or the gas 8, and it becomes possible to appropriately cope with required specifications by combining machining in the working liquid, machining in the mist, and machining in the gas in accordance with productivity, the accuracy required for the workpiece, and the like.

Figure 2:
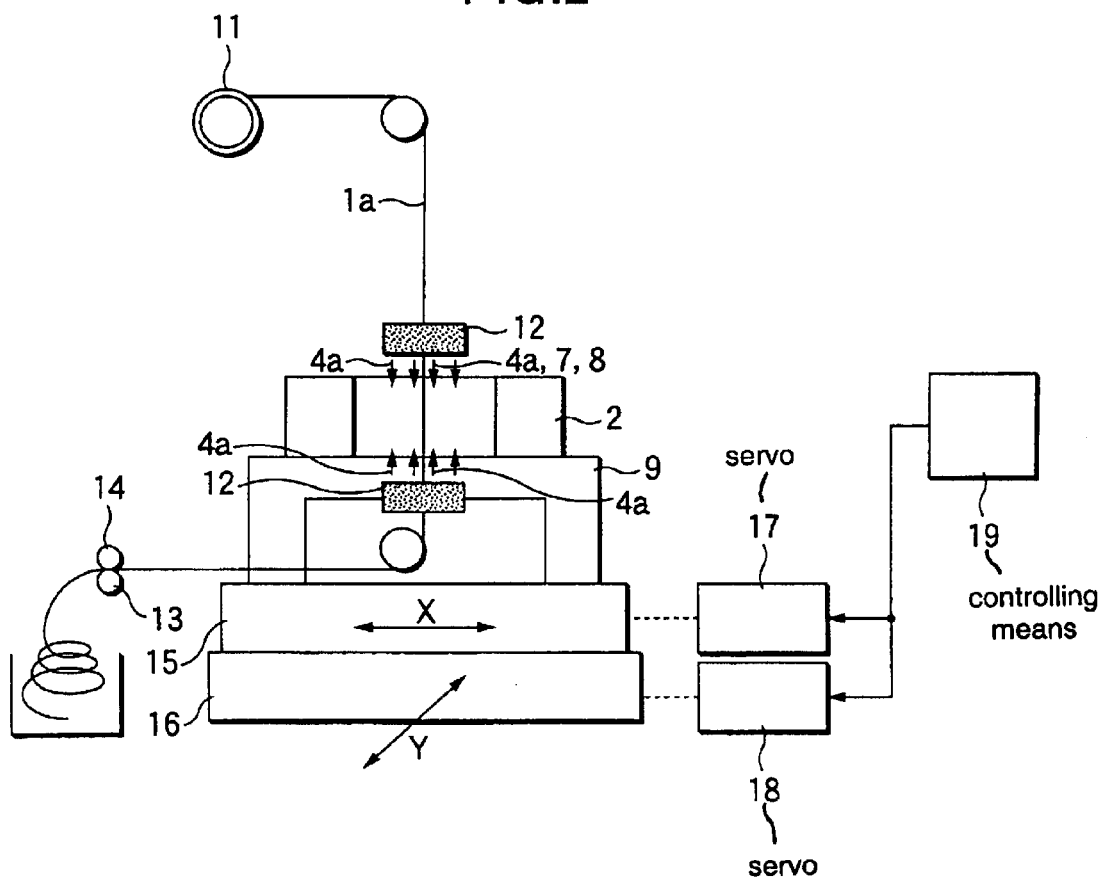
FIG. 2 is a schematic diagram illustrating a wire electrical discharge machining apparatus in accordance with the first embodiment of this invention.

FIG. 2 is a schematic diagram illustrating a wire electrical discharge machining apparatus in accordance with the first embodiment of this invention. In the drawing, reference numeral $1a$ denotes the wire electrode, reference numeral 2 denotes the workpiece, reference numeral $4a$ denotes the working liquid which is, for example, water, and reference numeral 7 denotes the mist. Reference numeral 8 denotes the gas, reference numeral 9 denotes a surface plate for fixing the workpiece 2, reference number 11 denotes a wire bobbin, and reference numeral 12 denotes a fluid supplying section. Reference numeral 13 denotes a capstan roller, reference numeral 14 denotes a pinch roller, reference numeral 15 denotes an X table for driving the workpiece 2 in a horizontal direction (in the X direction), reference numeral 16 denotes a Y table for driving the workpiece 2 in a horizontal direction (in the Y direction); reference numeral 17 denotes an X-axis servo amplifier for controlling an unillustrated drive motor for driving the X table 15, reference numeral 18 denotes a Y-axis servo amplifier for controlling an unillustrated drive motor for driving the Y table 16, and reference numeral 19 denotes a controlling section. The wire electrode $1a$ is nipped and pulled by the capstan roller 13 and the pinch roller 14, machining electric power is supplied across the gap between the wire electrode $1a$ and the workpiece 2 by an unillustrated machining-electric-power supplying section while the wire electrode $1a$ is driving, and machining of the workpiece 2 is performed while relatively moving the wire electrode $1a$ and the workpiece 2 by means of such as the X table and the Y table which are positioning sections.

Figure 3A:
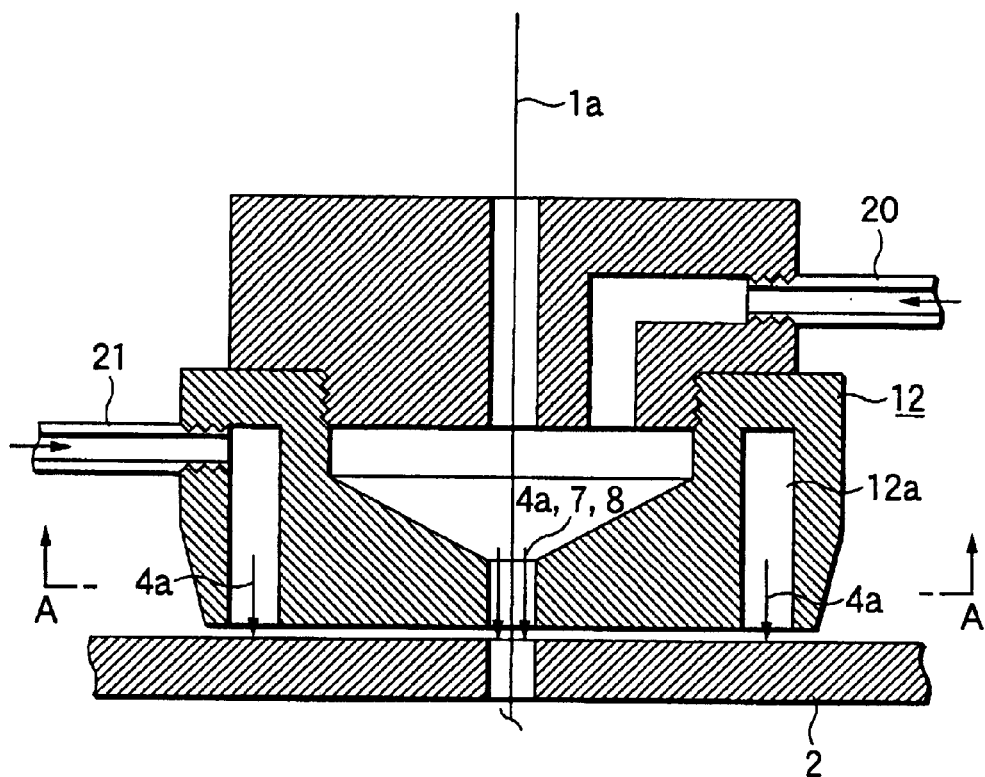
FIG. 3 is an explanatory diagram illustrating the configuration of a fluid supplying section of the-wire electrical discharge machining apparatus in accordance with the first embodiment of this invention.
Figure 3B:
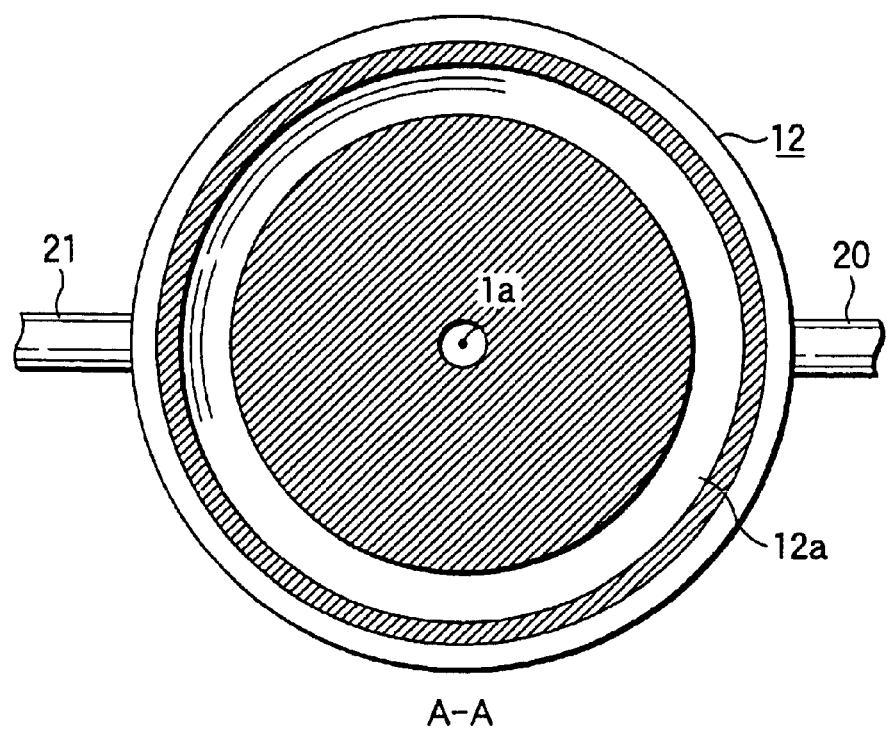

FIG. 3 is an explanatory diagram illustrating the configuration of the fluid supplying 12 of the wire electrical discharge machining apparatus in accordance with the first embodiment of this invention, in which FIG. $3(a)$ is a vertical cross-sectional view and FIG. $3(b)$ is a cross-sectional view taken along line A—A in FIG. $3(a)$. In FIG. 3, reference numeral $1a$ denotes the wire electrode, reference numeral 2 denotes the workpiece, reference numeral $4a$ denotes the working liquid which is, for example, water; 7. The mist; 8, the gas; 12, the fluid supplying section; and 12a, a grove formed in the fluid supplying section 12 concentrically on the outer side of the hole through which the wire electrode 1a is passed, so as to inject the working liquid 4a, which is a cooling fluid, toward the workpiece 2. Reference numerals 20 and 21 denote couplers.

FIG. 4 is an explanatory diagram of a method of supplying the fluid to the fluid supplying 12. In the drawing, reference numeral 4a denotes the working liquid which is, for example, water, reference numeral 22 denotes a working liquid tank, reference numeral 23 denotes a compressor for supplying a pressurized gas to the gap between the wire electrode 1a and the workpiece 2, and reference numeral 24 denotes a temperature controller for controlling the temperature of the working liquid 4a in the working liquid tank 22. Reference numerals 25 to 27 denote valves, and numeral 28 denotes a pump for supplying the working liquid 4a whose temperature has been controlled by the temperature controller 24. In the case where wire electrical discharge machining is performed in the gas or the mist while supplying the gas 8 or the mist 7 to the gap between the wire electrode 1aand the workpiece 2, the working liquid 4a, which is the cooling fluid, is injected from the groove 12a of the fluid supplying section 12 toward a vicinity of the gap concentrically with the wire electrode 1a by supplying the working liquid 4a form the coupler 21 to the fluid supplying section 12. The injection of such a cooling fluid is not limited to the concentric shape with respect to the wire electrode 1a, and suffices if the cooling fluid is injected toward the workpiece 2 from the outer side of the gas 8 or the mist 7 which is supplied to the gap as the working fluid.

In the case where wire electrical discharge machining is thus performed in the gas or the mist, if the gas 8 or the mist 7 is set under high pressure by the compressor 23 and is supplied to the gap, the workpiece can be cooled by supplying the cooling working liquid to the vicinity of the gap without causing the working liquid 4a to enter the gap. Hence, it is possible to effectively reduce thermal strains in the workpiece due to machining heat.

Next, a description will be given of the operation during actual machining. In the case where machining is performed while supplying the working liquid 4a to the gap between the wire electrode 1a and the workpiece 2, the valve 25 is closed, the valve 26 is opened, and the valve 27 is closed, and the working liquid 4a, which is the working fluid, is supplied to the coupler 20. In addition, in the case where machining is performed while supplying the gas 8 to the gap, the valve 25 is opened, the valve 26 is closed, and the valve 27 is opened, and the pressured gas 8, which is the working fluid, is supplied to the coupler 20, while the working liquid 4a, which is the cooling fluid, is supplied to the coupler 21. Further, in the case where machining is performed while supplying the mist 7 to the gap, all the valves 25, 26, and 27 are opened, the mist 7, which is the working fluid, is produced by the pressurized gas 8 from the compressor 23 and the working liquid 4a, and is supplied to the coupler 20, while the working liquid 4a, which is the cooling fluid, is supplied to the coupler 21. The changeover of opening and closing of these valves 25 to 27 is performed by the controlling section 19.

As described above, the fluid supplying section 12 has the functions (working-fluid supplying section) of the working-liquid supplying section, the mist supplying section, and the gas supplying section, as well as the function of a cooling-fluid supplying section for cooling the workpiece.

By virtue of the above-described configuration, the working liquid 4a, the mist 7, or the gas 8 is selectively supplied to the gap between the wire electrode 1a and the workpiece 2 in accordance with the required machining speed, machining accuracy, and so forth. At the same time, in wire electrical discharge machining in the gas or the mist, the workpiece 2 can be effectively cooled. Accordingly, as the thermal stresses in the workpiece are suppressed, it is possible to cope with such as applications in which higher accuracy and very smooth surface roughness are required.

Although a description has been given above of the case where the fluid supplying section 12 has the function of the working-fluid supplying section and the function of the cooling-fluid supplying section, the working-fluid supplying section and the cooling-fluid supplying section may be separated and provided separately.

FIG. 5 is an explanatory diagram of a method of supplying the fluid to the fluid supplying section 12 of the wire electrical discharge machining apparatus in accordance with a second embodiment of this invention. The configuration of the wire electrical discharge apparatus is similar to that of the first embodiment shown in FIG. 2, and the configuration of the fluid supplying section 12 is similar to that of the first embodiment shown in FIG. 3. In FIG. 5, the same reference numerals as those in FIG. 4 illustrating the first embodiment denote identical or corresponding portions, and reference numeral 29 denotes a cooler. In addition, the operation of such as the changeover of opening and closing of the valves 25 to 27 is similar to that in the first embodiment.

Second Embodiment

In FIG. 5, as the cooler 29 is disposed between the compressor 23 and the valve 25, in the case where electric discharge machining is performed while supplying a gas to the gap between the wire electrode and the workpiece, the gas which has been cooled by the cooler is supplied to the gap. In addition, in the case where machining is performed while supplying the mist to the gap, a mist is produced by using the pressurized gas which has been cooled by the cooler. Accordingly, as compared with the conventional case where a gas whose temperature is not controlled is used, it is possible to improve the efficiency of cooling a portion of the workpiece being machined in the case in which machining is performed while injecting the gas or spraying the mist to the gap between.

Third Embodiment

Figure 6:
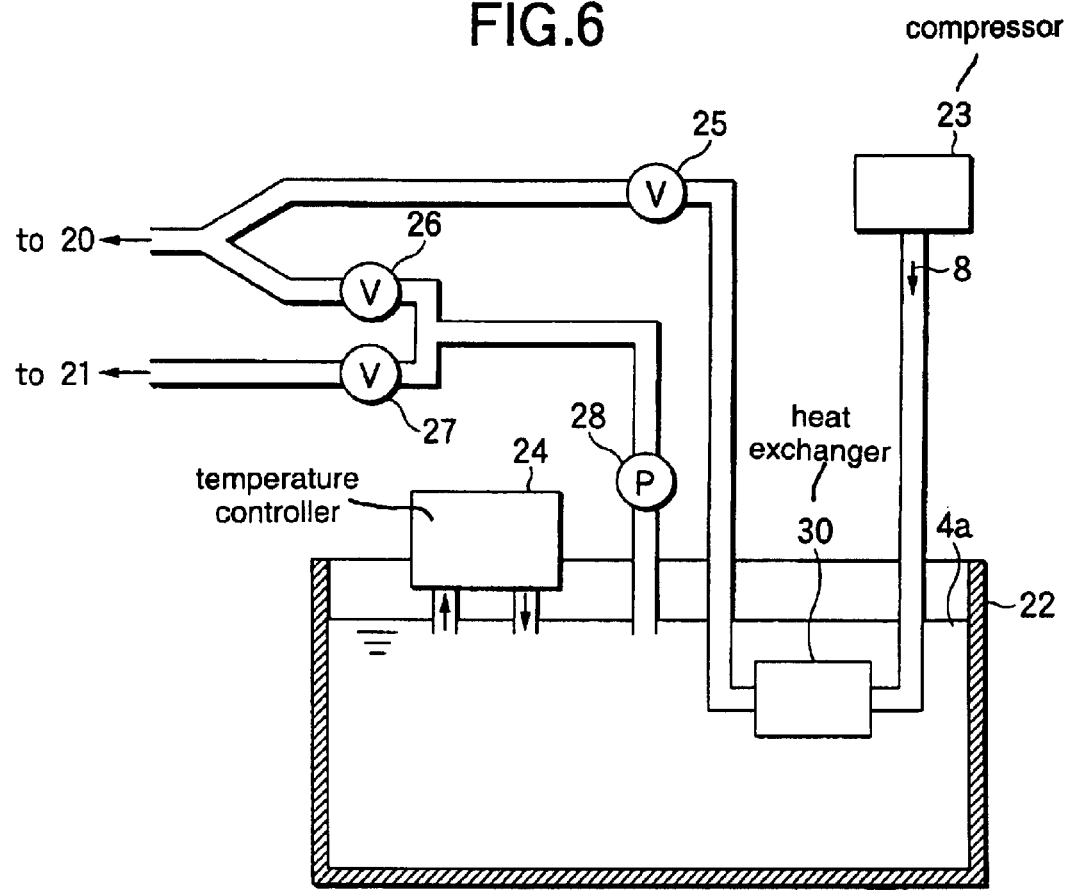
FIG. 6 is an explanatory diagram of a method of supplying the fluid to the fluid supplying section of the wire electrical discharge machining apparatus in accordance with a third embodiment of this invention.
Figure 7A:
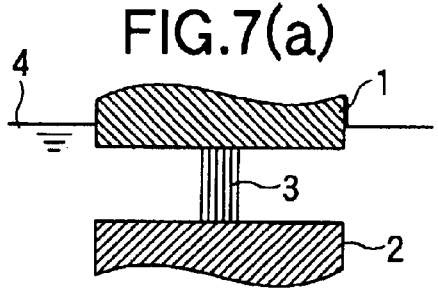
FIG. 7 is an explanatory diagram of a mechanism of electrical discharge machining.
Figure 7B:
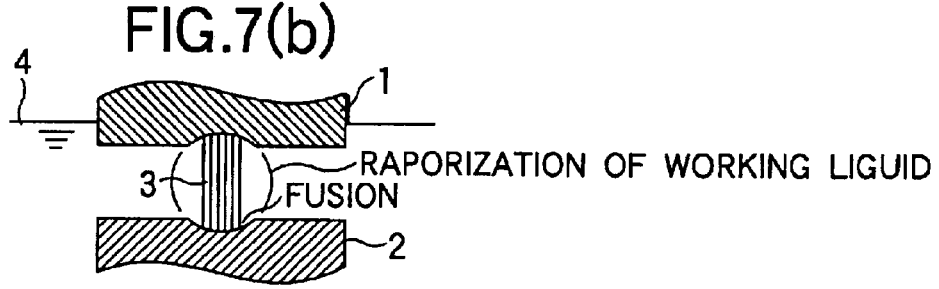
Figure 7C:
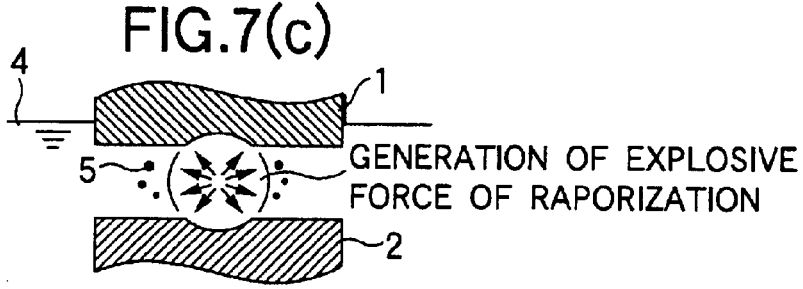
Figure 7D:
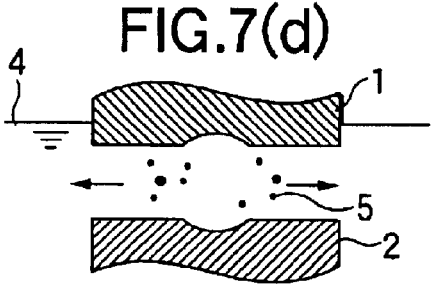
Figure 7E:
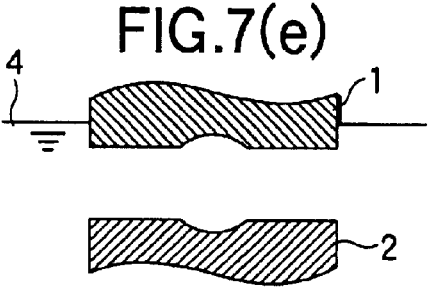

FIG. 6 is an explanatory diagram of a method of supplying the fluid to the fluid supplying section 12 of the wire electrical discharge machining apparatus in accordance with a third embodiment of this invention. The configuration, the operation, and the like of the wire electrical discharge apparatus are similar to those of the first and second embodiments. In FIG. 6, the same reference numerals are those in FIG. 4 illustrating the first embodiment and FIG. 5 illustrating the second embodiment denote identical or corresponding portions, and reference numeral 30 denotes a heat exchanger.

In FIG. 6, the heat exchanger 30 is added between the compressor 23 and the valve 25 in FIG. 4 illustrating the first embodiment, and this heat exchanger 30 is installed in the working liquid tank 22. Since the temperature of the working liquid 4a in the working liquid tank 22 is controlled to a room temperature or a temperature below the room temperature by the temperature controller 24, the air 8 pressurized by the compressor 23 is cooled by the working liquid 4a subjected to temperature control in the working tank 22. Accordingly, there is an effect of improving the efficiency of cooling a portion of the workpiece being machined in the same way as in the second embodiment. Furthermore, since the function of the cooler 29 in FIG. 5 illustrating the second embodiment can be realized with a simpler configuration, there is an advantage in that it is possible to attain a cost reduction.

Industrial Applicability

As described above, the method of and the apparatus for wire electrical discharge machining in accordance with this invention are particularly suitable for high-accuracy and high-quality electrical discharge machining operation.

What is claimed is:

1. A method of wire electrical discharge machining for machining a workpiece by generating electric discharge in a gap between a wire electrode and said workpiece, the method comprising the steps of:

performing the machining by combining at least two kinds of machining among three kinds of machining including machining in a working liquid, machining in a mist, and machining in a gas, and in a process of the machining in the mist or the gas, the machining is performed while cooling said workpiece.

2. A wire electrical discharge machining apparatus for machining a workpiece by supplying electric discharge energy to a gap between a wire electrode and said workpiece by a machining-electric-power supplying section and by relatively moving said wire electrode and said workpiece by a positioning section, the apparatus comprising:

a working-fluid supplying section for supplying a working liquid to the gap, a mist supplying section for supplying a mist to the gap, and a gas supplying section for supplying a gas to the gap;

a cooling-fluid supplying section for supplying a cooling fluid for cooling said workpiece; and a controller that controls said cooling fluid supplying section, said mist supplying section, and said gas supplying section, so as to supply the cooling fluid at least while also supplying one of the mist and the gas.

3. The wire electrical discharge machining apparatus according to claim 2, wherein said working-fluid supplying section supplies the working fluid to the gap along said wire electrode; and wherein said cooling-fluid supplying section injects the cooling fluid from outside the working fluid toward said workpiece.

4. The wire electrical discharge machining apparatus according to claim 3, wherein a fluid supplying section in which said working-fluid supplying section and said cooling-fluid supplying section are combined and are formed integrally is provided.

5. A wire electrical discharge machining apparatus for machining a workpiece by supplying electric discharge energy to a gap between a wire electrode and said workpiece by a machining-electric-power supplying section and by relatively moving said wire electrode and said workpiece by a positioning section, the apparatus comprising:

a working-fluid supplying section for supplying a working liquid to the gap, a mist supplying section for supplying a mist to the gap, and a gas supplying section for supplying a gas to the gap;

a cooling-fluid supplying section for supplying a cooling fluid to cool said workpiece; and a controlling section for controlling to perform a changeover among the supply of the working liquid to the gap by said working-liquid supplying section, the supply of the mist to the gap by said mist supplying section, and the supply of the gas to the gap by said gas supplying section, and for controlling the supply of the cooling fluid to said workpiece by said cooling-fluid supplying section during the supplying of the mist to the gap by said mist supplying section or during the supply of the gas to the gap by said gas supplying section, in accordance with productivity, the accuracy required for said workpiece.

6. The wire electrical discharge machining apparatus according to claim 5, wherein said working-fluid supplying section supplies the working fluid to the gap along said wire electrode, and further wherein said cooling-fluid supplying section injects the cooling fluid from outside the working fluid toward said workpiece.

7. The wire electrical discharge machining apparatus according to claim 5, wherein said working-liquid supplying section supplies the working liquid in a working liquid tank to the gap by means of a pump;

wherein said gas supplying section supplies the gas to the gap after pressurizing the gas by a compressor; and wherein said mist supplying section produces a mist by mixing the working liquid supplied by said working-liquid supplying section and the gas supplied by said gas supplying section and supplies the mist to the gap.

8. A wire electrical discharge machining apparatus for machining a workpiece by supplying electric discharge energy to a gap between a wire electrode and said workpiece by a machining-electric-power supplying section and by relatively moving said wire electrode and said workpiece by a positioning section, the apparatus comprising:

a working-fluid supplying section for supplying a working liquid to the gap, a mist supplying section for supplying a mist to the gap, and a gas supplying section for supplying a gas to the gap; and a cooling-fluid supplying section for supplying a cooling fluid for cooling said workpiece.

wherein said working-liquid supplying section supplies the working liquid in a working liquid tank to the gap by means of a pump;

wherein said gas supplying section supplies the gas to the gap after pressurizing the gas by a compressor; and wherein said mist supplying section produces a mist by mixing the working liquid supplied by said working-liquid supplying section and the gas supplied by said gas supplying section and supplies the mist to the gap.

9. The wire electrical discharge machining apparatus according to claim 8, wherein said cooling-fluid supplying section pressurizes the working liquid in said working liquid tank by said pump and supplies the working liquid to the gap.

10. The wire electrical discharge machining apparatus according to claim 8, further comprising a cooling section for cooling the gas pressurized by said compressor.

11. The wire electrical discharge machining apparatus according to claim 10, wherein said cooling section is formed by using a heat exchanger disposed in said working liquid tank.

* * * * *